(12) United States Patent
Gambarotta et al.

(10) Patent No.: US 10,376,979 B2
(45) Date of Patent: Aug. 13, 2019

(54) APPARATUS AND METHOD FOR CONNECTING METAL WORKPIECES

(71) Applicant: Kairos Industrial AG, Freienbach (CH)

(72) Inventors: Riccardo Gambarotta, Zurich (CH); Alessandro Gambarotta, Zurich (CH)

(73) Assignee: Kairos Industrial AG, Freienbach (CH)

( * ) Notice: Subject to any disclaimer, the term of this patent is extended or adjusted under 35 U.S.C. 154(b) by 197 days.

(21) Appl. No.: 15/588,020

(22) Filed: May 5, 2017

(65) Prior Publication Data
US 2018/0318960 A1  Nov. 8, 2018

(51) Int. Cl.
| | |
|---|---|
| *B23K 35/02* | (2006.01) |
| *B23K 101/06* | (2006.01) |
| *B23K 101/18* | (2006.01) |
| *B23K 9/02* | (2006.01) |
| *B23K 23/00* | (2006.01) |
| *B23K 33/00* | (2006.01) |

(52) U.S. Cl.
CPC ............ *B23K 9/0213* (2013.01); *B23K 23/00* (2013.01); *B23K 33/004* (2013.01); *B23K 35/0233* (2013.01); *B23K 35/0272* (2013.01); *B23K 33/00* (2013.01); *B23K 2101/06* (2018.08); *B23K 2101/18* (2018.08)

(58) Field of Classification Search
CPC ...... B23K 9/0213; B23K 23/00; B23K 33/00; B23K 33/004; B23K 35/0233; B23K 35/0272; B23K 2101/06; B23K 2101/18
See application file for complete search history.

(56) References Cited

U.S. PATENT DOCUMENTS

| | | | | |
|---|---|---|---|---|
| 2,468,372 A | * | 4/1949 | Landis ............... | B23K 35/0255 219/137 R |
| 2,745,368 A | * | 5/1956 | Klein ................... | B23K 1/0006 228/56.3 |
| 2,961,363 A | | 11/1960 | Lowes | |
| 3,308,532 A | * | 3/1967 | Long .................... | B23K 1/0006 228/178 |
| 3,464,802 A | * | 9/1969 | Meyer ...................... | B23K 9/23 428/594 |
| 3,578,896 A | * | 5/1971 | Lynch ...................... | H01R 4/58 156/49 |
| 3,663,335 A | * | 5/1972 | Sheedy ................ | B23K 1/0006 156/499 |

(Continued)

*Primary Examiner* — William M McCalister
(74) *Attorney, Agent, or Firm* — The Webb Law Firm

(57) ABSTRACT

A welding tape for thermally connecting metal workpieces by fusion, wherein the welding tape in a cross section has an outwardly closing cover layer which comprises an inner cover layer and an outer cover layer, wherein in the transverse direction provision is made at least in side edge regions of the inner cover layer for adhesive layers by means of which the welding tape can be fastened to the workpieces to be connected, wherein in the interior of the cover layer provision is made for a self-combusting exothermic substance, which during ignition provides the thermal energy which is required for the welding, wherein a non-combustible heat shield is arranged exclusively between the exothermic substance and the outer cover layer, and wherein a welding additive is provided between the exothermic substance and the inner cover layer.

11 Claims, 4 Drawing Sheets

(56) References Cited

U.S. PATENT DOCUMENTS

| | | | | |
|---|---|---|---|---|
| 4,049,183 | A * | 9/1977 | Roden | B23K 9/0356 |
| | | | | 156/293 |
| 4,145,598 | A * | 3/1979 | Iio | B23K 9/0352 |
| | | | | 219/137 R |
| 5,381,944 | A * | 1/1995 | Makowiecki | B23K 35/001 |
| | | | | 228/124.5 |
| 5,443,056 | A * | 8/1995 | Smith | B29C 65/247 |
| | | | | 126/263.05 |
| 5,538,795 | A * | 7/1996 | Barbee, Jr. | C06B 45/14 |
| | | | | 228/124.5 |
| 5,902,498 | A | 5/1999 | Mistry et al. | |
| 6,736,942 | B2 * | 5/2004 | Weihs | B23K 1/0006 |
| | | | | 204/192.12 |
| 7,644,854 | B1 * | 1/2010 | Holmes | B23K 1/0008 |
| | | | | 228/234.3 |
| 8,172,963 | B2 * | 5/2012 | Schroder | C06C 5/04 |
| | | | | 149/108.2 |
| 8,342,383 | B2 * | 1/2013 | Gilman | B23K 1/0006 |
| | | | | 228/107 |
| 2001/0038029 | A1 * | 11/2001 | Weihs | B23K 1/0006 |
| | | | | 228/117 |
| 2001/0047983 | A1 * | 12/2001 | Degawa | B23K 33/004 |
| | | | | 219/121.64 |
| 2005/0051607 | A1 * | 3/2005 | Wang | B23K 1/0006 |
| | | | | 228/246 |
| 2005/0121499 | A1 * | 6/2005 | Heerden | B23K 1/0006 |
| | | | | 228/246 |
| 2007/0267595 | A1 * | 11/2007 | Dodo | A61F 7/034 |
| | | | | 252/67 |

* cited by examiner

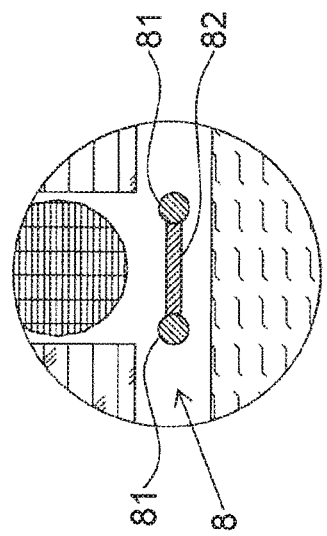
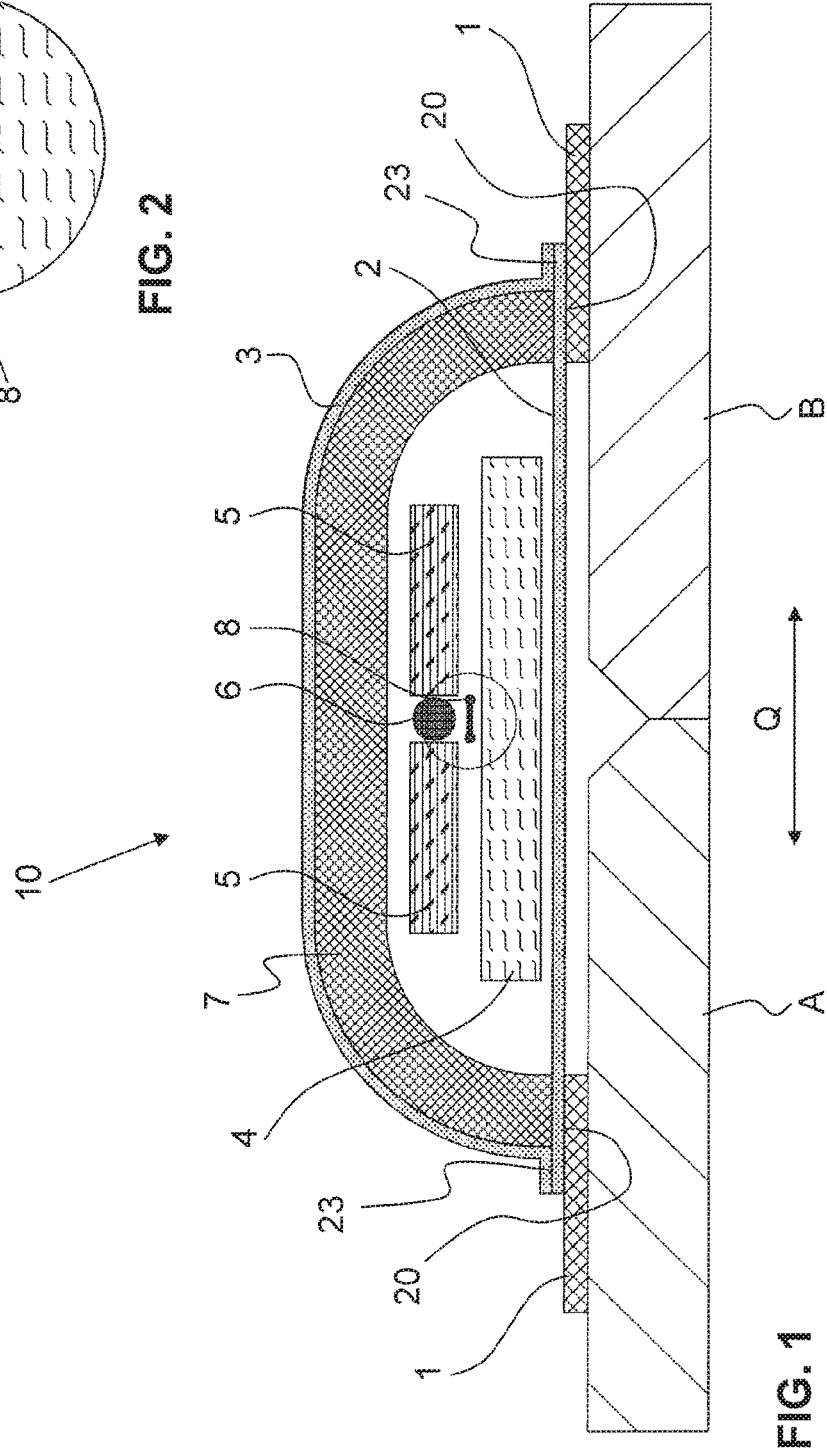

APPARATUS AND METHOD FOR CONNECTING METAL WORKPIECES

BACKGROUND OF THE INVENTION

Field of the Invention

The present invention relates to a device and a method for connecting metal workpieces by means of an adhesible welding tape.

Description of Related Art

In engineering, it is known to connect metal workpieces to each other by means of fusion welding. The methods which are used for this are for example gas-fusion welding, manual arc welding, gas-shield welding, tungsten-inert gas welding, under powder welding, laser welding, electron beam welding and aluminothermic welding.

All these methods have a large space requirement since they require auxiliary units for implementation. These methods in the best case are mobile but they are hardly portable or not portable at all. Auxiliary units are for example gas cylinders, transformers and power cables which limit the mobility of the welding plant. The large space requirement determines that such plants are used in a roofed hall with controlled temperature and air humidity. These methods also require a long training period and a high degree of knowledge. The unprofessional implementation of these methods is dangerous for the operators and the connections produced by non-professionals are of poorer quality.

Also known from the prior art is aluminothermic welding which is used particularly when welding railway lines. In this case, the rails to be connected are aligned at a certain distance from each other and a mixture consisting of iron oxide powder and aluminum powder is arranged in a crucible above the weld point. After ignition, at a temperature of about 2,450 degrees Celsius, the iron liquefies and flow into the gap between the two rails.

This method is unsuitable for more complex welding since a crucible has to be arranged above the point to be welded. Also, handling of powdered welding medium is unsuitable in a damp or wet environment.

When connecting plastics, it is known to connect plastic parts to each other by attaching heat packs above the point to be welded. U.S. Pat. No. 3,663,335 shows such a heat pack, wherein a combustible material is encompassed by an insulation layer in order to achieve a slowly rising temperature, which does not exceed a determined value, of about 100 degrees Celsius and to maintain this over a longer period of time.

U.S. Pat. No. 2,961,363 shows the connecting of plastic pipes by means of a ring which is filled with a self-combusting exothermic substance. In this case, the ring is arranged and ignited directly between the parts to be connected.

U.S. Pat. No. 5,902,498 describes an application for connecting metal components, in which a low-temperature connecting technique is used, wherein the connecting is undertaken via a paste, a spray, a tape or as a paint application.

In U.S. Pat. No. 2,468,372, the welding materials are poured into a flexible bag with side flaps.

U.S. Pat. No. 3,308,532 describes an exothermic welding method with an abutting arrangement with several heat deflectors.

U.S. Pat. No. 2,745,368 finally describes a heating device which can also be used for soldering and for welding.

SUMMARY OF THE INVENTION

Starting from the prior art, it is therefore an object of the invention to avoid the aforesaid disadvantages and to provide a device by means of which metal parts can be simply and reliably connected to each other and to provide a method, using this device, which can be safely implemented by non-professionals and achieve good welding results.

These objects are achieved by means of a welding tape having the features of claim 1 and by means of a method having the features of claim 9.

In a preferred embodiment of a welding tape according to the invention for thermally connecting metal workpieces by fusion, the dimensions of the welding tape in a longitudinal direction are a multiple of the dimensions in a transverse direction perpendicular to the longitudinal direction. In a cross section perpendicular to the longitudinal direction, the welding tape has an outwardly closing cover layer which comprises an inner cover layer and an outer cover layer. The inner cover layer is designed so as to face the parts of the workpieces which are to be directly connected in a designated in-use position, and the outer cover layer is designed so as to face away from the parts of the workpieces which are to be directly connected. In the transverse direction, provision is made at least in side edge regions of the inner cover layer for adhesive layers by means of which the welding tape can be fastened to the workpieces to be connected. In the interior of the cover layer, provision is made for a self-combusting exothermic substance which when igniting provides the thermal energy which is required for the welding.

A non-combustible heat shield, which withstands the burn-off temperature of the exothermic substance and which counteracts the escape of heat to the outside, is preferably arranged exclusively between the exothermic substance and the outer cover layer. Between the exothermic substance and the inner cover layer provision is made for a welding additive which melts during burn-off of the exothermic substance and can bond with the workpieces to be connected.

The exothermic substance is substantially responsible for the producible heat. A possible exothermic substance is thermite which combusts at 2,450 degrees Celsius. Alternatively, pyrotechnic mixtures based on aluminum, boron, barium, chromate, aluminum oxide or the like can be used. Basically, all material combinations which can generate an exothermic redox reaction can be used. By means of additives, such as fluorides, the burn-off temperature can be influenced. A uniform burn-off at a temperature which is about 50% higher than the melting temperature of the material of the workpieces to be connected is advantageous. Preferably, the burn-off should take place without the development of smoke as far as possible.

Also, the temperature which acts upon the points to be connected can be influenced by the design of the heat shield. Ceramic fibers are customarily used for the construction of the heat shield. The aforementioned temperature can be influenced by the construction and the thickness.

The exothermic substance and the welding additive are preferably of tape-like design. This facilitates the arrangement in the welding tape and ensures a uniform distribution across the width. It is also ensured that sufficient welding additive is available in order to realize the connection. For example, provision can be made on the welding tape for a marking which indicates for which type of weld the tape is suitable. For example, for a connection of two steel plates of 3 to 5 millimeters in thickness. Tapes with other markings for the welding of workpieces consisting of other materials and with other thicknesses are also feasible. A color coding for the various materials, for example blue for steel and red for copper, are also conceivable. Alternatively or additionally, the combustion temperature can be recorded on the tape exterior.

The internal construction of a welding tape can also be associated with an identification. For example, a rectangle can symbolize a rectangular cross section of the welding additive and a triangle, a trapezium, a semi-circle or a semi-ellipse can symbolize a corresponding cross section. The width of the welding additive and of the exothermic substance determine the width of the producible weld seam. Unlike the conventional welding methods, very wide weld seams, for example in the range of between 1 and 20 millimeters, can be produced at the same time.

In a preferred embodiment, an ignition agent is arranged in the direct proximity of the exothermic substance in order to ensure a complete burn off of said exothermic substance.

A further embodiment features a ceramic separation layer between the welding additive and the ignition mixture. This has the advantage that the ignition mixture cannot mix with the welding additive and thereby contaminate the weld seam. Furthermore, it leads to a certain temperature reduction, which is advantageous in the case of materials which have a lower melting point.

The exothermic substance is preferably in a multiplicity of parts and the ignition agent is arranged between two adjacent parts of the exothermic substance. This ensures that the exothermic substance reliably burns off in any event. This also enables the removal of certain sections of the welding tape without damaging the ignition agent, for example a fuse. This is for example advantageous when welding corners regions. Since the tape cannot be pressed all the way into a corner on account of its natural stiffness, it can be cut and positioned so the cut point is located right in the corner.

In order to simplify a burn-off of individual regions of the tape, weak points can be designed in the tape. For a discontinuous weld seam, the tape can first of all be arranged over the entire length of the point to be welded and individual regions between two weak points can then be removed without disturbing the fuse in the process.

In an advantageous embodiment, the inner cover layer is formed, adhesively fastened or welded in one piece with the outer cover layer. Depending on the type of production, certain developments of the cover layer are advantageous. For the production of welding tapes with lengths of up to 10 meters, tubes as the cover layer can be of advantage. The content of the tape, i.e. the insulation layer, the welding additive, the exothermic substance and the fuse can then be drawn into the cover-layer tube.

Adhesive fastening or welding is expedient in the case of an endless production since the lower cover layer can be used as a depositing surface on which the tape content is deposited, as described above. The thereby created stack is then closed off by the upper cover layer and the two cover layers adhesively fastened or welded together.

The outer cover layer is preferably completely covered by a pressure layer so that a pressure chamber, which is delimited at least by means of the outer cover layer and the pressure layer, is created. The pressure layer enables the application of a positive pressure in the pressure chamber, as a result of which a force presses from above onto the point to be welded. The molten welding additive therefore flows not only into the region to be connected due to gravity force, but is actively pressed into the region as a result of the positive pressure. This enables welding not only in inclined regions but even welding overhead.

The pressure layer is advantageously adhesively fastened or welded to the outer cover layer or to the adhesive layers. This constitutes a simple construction. The adhesive layers can for example be of double-sided design with adhesive effect. By one part of a first side, the adhesive layer is connected to an edge region of the lower cover layer and by another part of the first side the adhesive layer is connected to an edge region of the pressure layer. Before use, a second side of the adhesive layer is covered by a separating layer, which prevents an undesirable adhesion before the designated use.

The interior of the cover layer is preferably free of oxygen and nitrogen or filled with an inert gas. As a result, the effect of oxygen or nitrogen being present in the region of the weld seam is avoided. Also, the effect of for example the welding additive oxidizing during longer storage is consequently prevented.

In a preferred method for thermally connecting metal workpieces by fusion, wherein the workpieces to be connected are arranged in an abutting, angled or overlapping manner, a welding tape according to the invention is arranged above the regions of the workpieces to be connected.

The welding is preferably initiated by igniting the ignition agent. This prevents an unwanted self-ignition since only an igniter is to be brought into contact with the ignition agent.

The ignition agent is preferably ignited by means of an open flame or by means of an electric igniter. These are simple types of ignition and can be operated anywhere and without any risk by non-professionals.

In a preferred method, a positive pressure is created in the pressure chamber before initiating the welding. This has the effect of the welding additive being pressed against the region to be connected and ensures a flow of the welding additive into the weld region.

The welding tape to be used is preferably selected on the basis of its welding additive. For welding steel, for example a welding additive based on steel is used and for copper one based on copper.

In a preferred method, the welding tape is used for welding under water. As a result of the advantageous construction of a tightly sealed cover layer, it is possible to use the welding tape even under water. When being used under water, it is important that the free ends of the welding tape are sealed water-tight. If the ignition mixture is held in separate containers, for example in plastic tubes, then it remains dry even if moisture penetrates into the welding tape, at least over a certain period of time.

In a further method, the welding tape is used for welding overhead. As a result of the pressure chamber above the cover layer, a press-on force can be exerted upon the welding additive, as a result of which the influence of the gravity force can be at least partially compensated and the molten welding additive is for example also pressed from the bottom upward to the point to be connected.

Further embodiments are disclosed in the dependent claims.

BRIEF DESCRIPTION OF THE DRAWINGS

Preferred embodiments of the invention are described in the following text with reference to the drawings which serve only for explanation and are not to be interpreted as being limiting. In the drawings:

FIG. 1 shows a cross section through a first embodiment of a welding tape according to the invention in a first application;

FIG. 2 shows a detailed view of FIG. 1 with an igniter installed;

DESCRIPTION OF THE INVENTION

Figure 3:
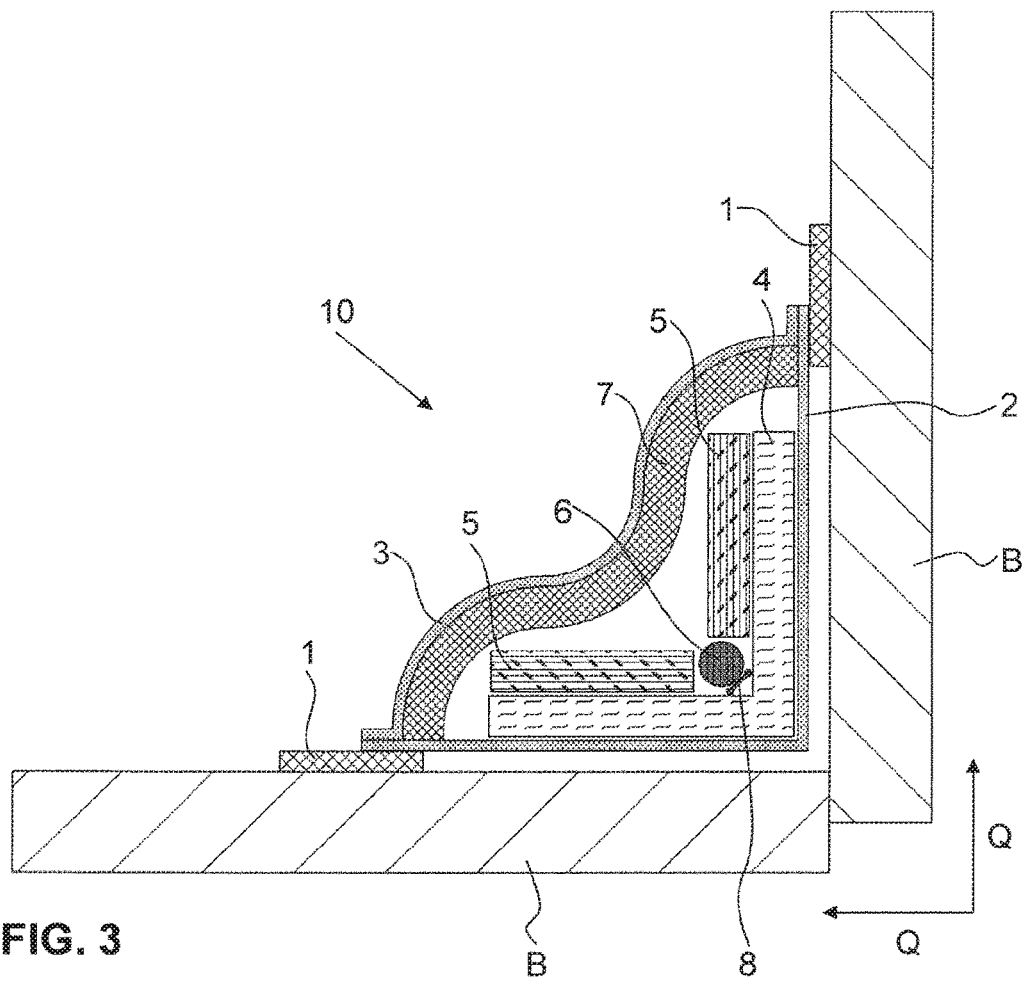
FIG. 3 shows a cross section through the welding tape of FIG. 1 in a further application.

FIG. 1 shows a cross section through a first embodiment of a welding tape 10 according to the invention in a first application, wherein the two workpieces A, B are to be connected to each other in an abutting manner. To this end, the corresponding abutment points of the two workpieces A, B to be connected can be prepared in the conventional manner. A chamfering of the upper edges to be connected is shown. The immediate vicinity of the connecting point is to be freed of dirt and oil. The workpieces A, B to be connected are to be aligned with each other and fixed.

A welding tape 10 according to the invention is arranged above the connecting point. The welding tape 10 has a closed sealing cover layer 2, 3 in cross section. Shown is a cover layer with a two-part construction which comprises an inner cover layer 2 and an outer cover layer 3, wherein the inner cover layer 2 faces the connecting point and the outer cover layer 3 faces away from the connecting point. The two cover layers are connected to each other in the transverse direction Q in side edge regions 23 of established connections, for example by means of an adhesive connection or welded connection. The two cover layers 2, 3 are plastic foils, for example consisting of polyethylene, which are connected to each other by adhesives, for example on an acrylic base. Alternatively, the cover layers 2, 3 can be formed in one piece. The cover layer is then a plastic tube consisting of the aforesaid materials.

Figure 5:
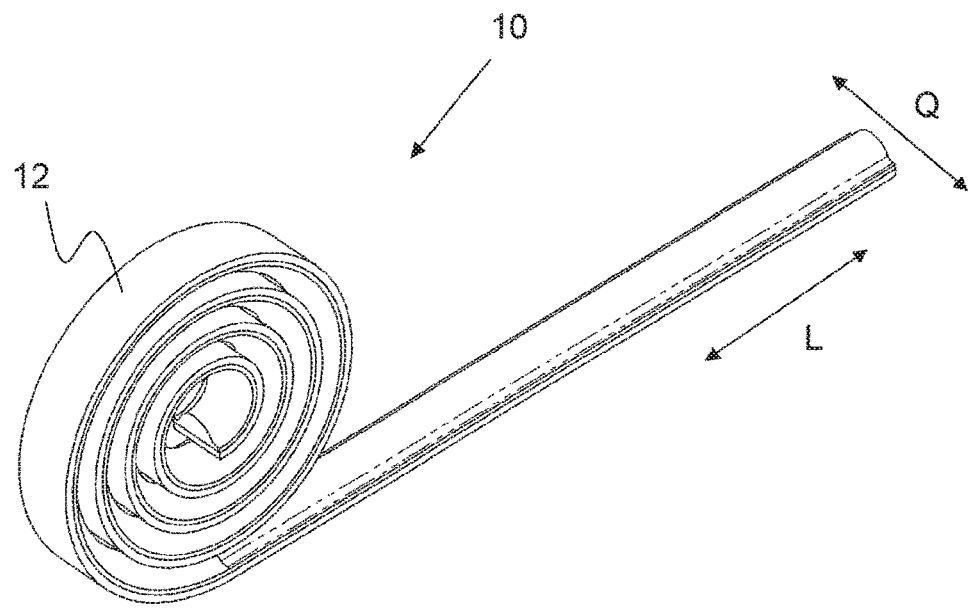
FIG. 5 shows a perspective view of a welding tape according to the invention in a partially rolled up state.

The cover layer 2, 3 is arranged with adhesive layers 1 on the workpieces A, B to be connected. The adhesive layers are in a storage form, i.e. are covered by a separating layer 12 before the designated use, as shown in FIG. 5. The adhesive layers 1 are arranged in the side edge regions 20 of the inner cover layer 2, wherein each of the adhesive layers is fastened with half on the inner cover layer and half projecting to the side above this. The adhesive layers can be designed in such a way that they do not project beyond the cover layer or in another ratio, for example 1/3 to 2/3 or 2/3 to 1/3.

In the interior of the cover layer 2, 3, provision is made exclusively on the outer side, i.e. adjoining the outer cover layer 3, for a heat shield 7. The heat shield 7 is at least partially connected to the cover layer, for example by means of an adhering or adhesive connection. Alternatively, the heat shield 7 is laid in the interior, i.e. not connected to the cover layer, but only butting against this. The heat shield comprises for example ceramic or glass fibers. By means of the heat shield 7, the effect of heat from the interior of the cover layer escaping from the welding tape 10 toward the outside, i.e. in the direction of the outer cover layer, is prevented. The heat flow toward the outside is advantageously reflected back into the interior again, i.e. in the direction of the inner cover layer or in the direction of the workpieces to be connected.

In the interior of the cover layer 2, 3, provision is made exclusively on the inner side, i.e. adjoining the inner cover layer 2, for a welding additive 4. The welding additive 4 is at least partially connected to the cover layer, for example by means of an adhering or adhesive connection. Alternatively, the welding additive 4 is laid in the interior, i.e. not connected to the cover layer, but only butting against this. Shown is a tape-like welding additive which in cross section has a larger dimension in the transverse direction than in thickness. The welding additive has a constant thickness across the width, i.e. in the transverse direction. Alternatively, the thickness in the middle can be greater than at the side ends. In this case, it would have more welding additive material in the region of the weld, i.e. more material would be available above the weld seam. The cross section of the welding additive would then be of triangular or trapezoidal shape. Cross sections of semi-elliptical shape or cross sections differently distributed across the thickness are also conceivable.

Alternatively, and not shown, the welding additive can be segmented across the width since this increases the flexibility of the welding tape in the transverse direction.

The welding additive advantageously has a similar or identical material to the workpieces A, B to be connected. Metallic welding additives contain for example steel, copper, tin, brass or their alloys.

Between the welding additive 4 and heat shield 7, provision is made for a self-combusting exothermic substance 5, the so-called ignition mixture, for example thermite. Alternatively, pyrotechnic mixtures based on aluminum, boron, barium, chromate, aluminum oxide or the like can be used. In general, all ignition mixtures which are self-combusting or exothermic can be used.

By means of the quantity and composition of the ignition mixture the totally released quantity of heat can be established.

The ignition mixture is of tape-like design and has a larger dimension in the transverse direction than in thickness. Since the ignition mixture is mostly in granulate or powder form, it is blended by a binding medium or poured into a container. For example, it can be poured into tubes consisting of plastic foil. Shown are two ignition mixture tapes which are arranged symmetrically with regard to the cross-sectional center axis and between which is provided a fuse 6. Alternatively, a plurality of tubes filled with ignition mixture can be arranged next to each other.

The ignition mixture 5, depending on the workpieces A, B to be connected, can have a different composition, as a result of which the burn-off speed or burn-off temperature can be set. It is also conceivable that the composition of the ignition mixture changes across the width, in the transverse direction, so that for example the temperature which can be generated in the middle of the welding tape 10 is higher than in the edge regions.

The fuse 6 is arranged centrally between the two ignition mixture strips 5. It can, however, also be arranged between the ignition mixture 5 and the heat shield 7. The fuse extends over the entire length of the welding tape 10 and ensures that the ignition mixture reliably burns off.

An igniter 8 is shown centrally between the welding additive 4 and the ignition mixture 5. The igniter 8, however, is introduced into the interior of the welding tape 10 at a free end of said welding tape 10 just before initiating the welding. As shown in FIG. 2, such an igniter 8 has electric conductors 81 and a resistance 82. In the case of the depicted igniter, it is an electric igniter. Alternatively, the fuse 6 can be realized by an open flame or other ignition agents which achieve the required ignition temperature.

FIG. 3 shows a cross section through a first embodiment of a welding tape 10 according to the invention in a further application, wherein the two workpieces A, B are to be connected to each other at an angle.

As shown, the cross section of the welding tape 10 can deform, as a result of which it becomes possible to bring the welding tape close up to the point to be welded. Shown is a welding tape which is arranged on the inner side of an angle. The welding tape, however, can be arranged on the outer side of an angle.

Figure 4:
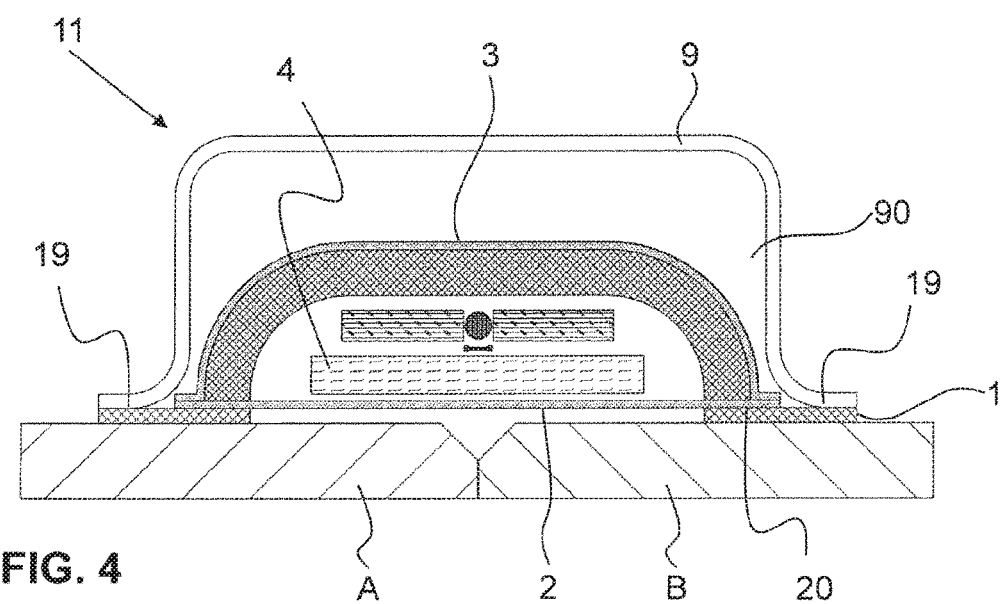
FIG. 4 shows a cross section through a second embodiment of a welding tape according to the invention in the application of FIG. 1.

FIG. 4 shows a cross section through a second embodiment of a welding tape according to the invention in the application of FIG. 1. The welding tape 11 additionally has a pressure layer 9 which completely covers the upper cover layer 3. The pressure layer 9 is designed in such a way that a pressure chamber, which can charged with a positive pressure, is created between the upper cover layer 3 and the pressure layer 9. The pressure layer 9 is connected at the side to the parts 19 of the adhesive layers 1 which project beyond the cover layer 3. Alternatively, the pressure layer 9 can also be connected to the cover layer 3.

By creating a positive pressure in the pressure chamber 90, the cover layer 3, together with its contents, is pressed inwardly against the workpieces A, B to be connected. This is particularly advantageous if for example welding is to be carried out over head. When welding overhead, the welding tape, due to gravity force, is inclined to sag. As a result of the positive pressure in the pressure chamber 90, this can be counteracted and the welding additive 4 can be pressed against the point to be welded.

For creating the positive pressure, the free ends of the pressure chamber 90 have to be tightly sealed. This can be achieved by means of adhesive tape or by means of end pieces which are provided for this, for example in the form of clamping sleeves. Such end pieces can have connections for a pressure line, wherein these connections preferably have a valve so that the pressure line can be removed before commencement of welding. Alternatively, connections can be arranged on the pressure layer 9 from the top, i.e. from the side opposite the lower cover layer 2.

FIG. 5 shows a perspective view of a welding tape according to the invention in a partially rolled-up state, which corresponds to the storage form, i.e. to the form before the designated use. The tape, as shown, can be rolled or cut into strips of predetermined lengths. A plurality of such rolls can be combined forming a cylinder. Alternatively, a welding tape according to the invention can be wound onto a drum.

Figure 6:
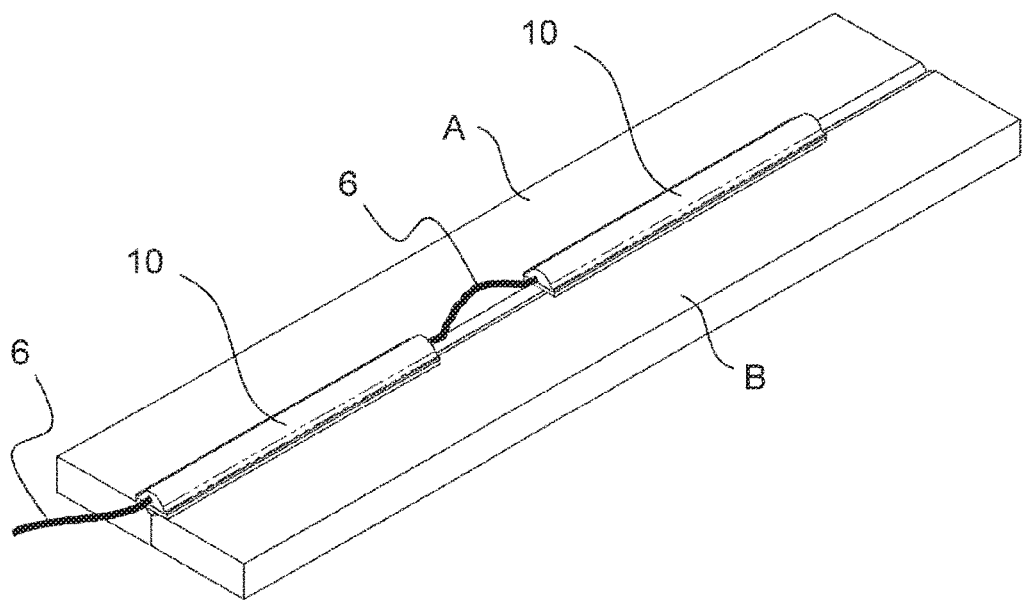
FIG. 6 shows a perspective view of a welding tape according to the invention in the application of FIG. 1.

FIG. 6 shows a perspective view of a welding tape according to the invention in the application of FIG. 1, but with a discontinuous welding tape 10. The depicted situation can be achieved in different ways. Individual strips can be cut and applied to the point to be welded one after the other. The individual strips can then be connected to each other by fuses 6. Alternatively, one piece can be separated from the welding tape without the fuse 6 being destroyed in the process. To this end, weak points can be provided in the welding tape, i.e. in the individual layers of the welding tape. The welding tape can then be easily separated at these weak points.

The free ends of the welding tape 10 can be tightly sealed by means of adhesive tape or by means of clamping sleeves which are provided for this. As an option, an igniter with a connecting cable can be integrated into the clamping sleeve. The tight sealing is particularly necessary when welding in a damp or wet environment, especially when welding under water.

Figure 7:
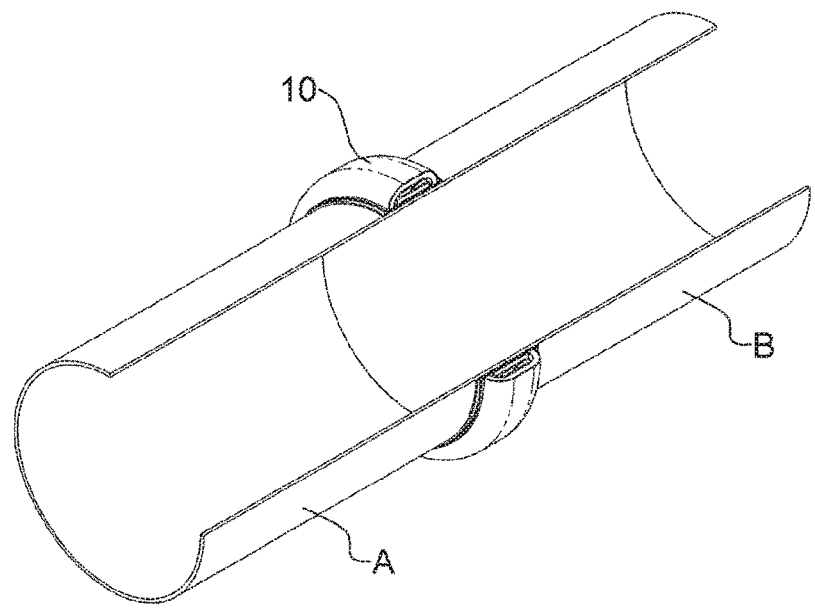
FIG. 7 shows a perspective partially sectioned view of a welding tape according to the invention in a further application.

FIG. 7 shows a perspective partially sectional view of a welding tape according to the invention in a further application, wherein two tube pieces are to be connected to each other. The welding tape is arranged on the outside on the entire circumference above the point to be welded. Alternatively, the welding tape can also be arranged on the inner side.

Figure 8:
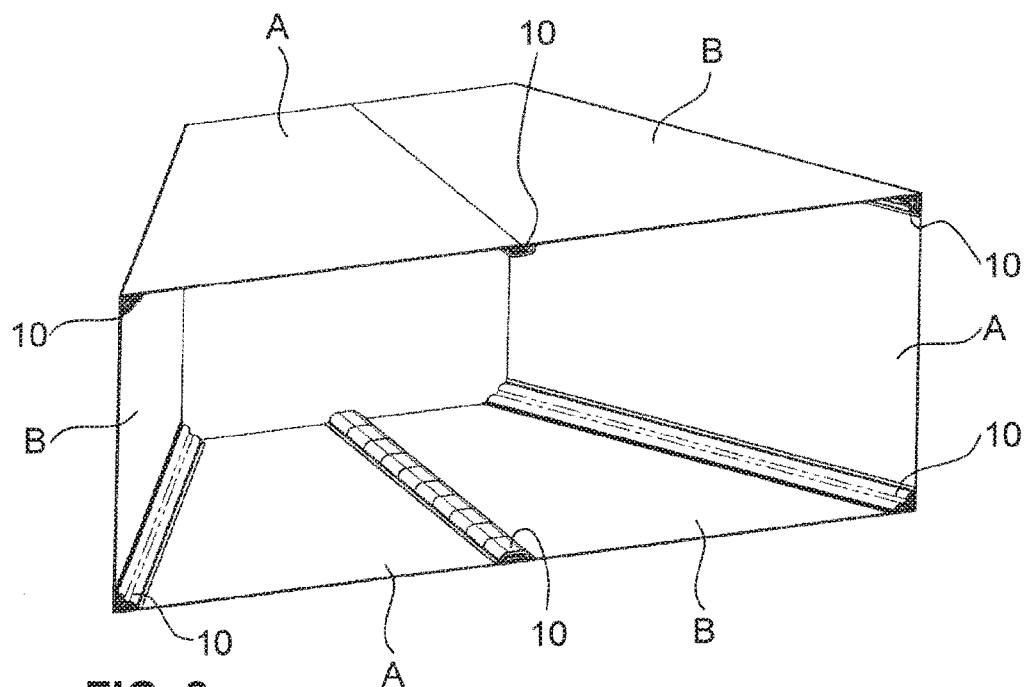
FIG. 8 shows a perspective view of welding tapes according to the invention in a further application.

FIG. 8 shows a perspective view of welding tapes according to the invention in a further application, wherein sheet metal parts A, B are to be connected to each other forming a circumferentially closed structure. Shown are the application examples, depicted in FIGS. 1 and 3, in a specific application. The welding tapes are arranged in the interior of the structure above the connecting points over the entire length. Alternatively, as shown in FIG. 6, they can be arranged only over a part of the length in order to achieve discontinuous welds. As in the currently described applications, the welding tapes can also be arranged on the outer side.

Before applying the welding tapes, the individual sheet metal parts have to be aligned with each other and fixed. It is also possible to achieve the fixing solely or largely by means of the welding tape.

LIST OF DESIGNATIONS

1 Adhesive tape
10 Welding tape
11 Welding tape
12 Separating layer
19 Projection
2 Lower cover layer
20 Edge region
23 Edge region
3 Upper cover layer
4 Welding additive
5 Ignition mixture
6 Fuse
7 Heat shield
8 Igniter
81 Conductor
82 Resistance
9 Pressure layer
90 Pressure chamber
A First workpiece
B Second workpiece
Q Transverse direction
L Longitudinal direction

The invention claimed is:

1. A welding tape for thermally connecting at least two metal workpieces by fusion, the welding tape comprising: a longitudinal direction and a transverse direction, wherein the dimensions of the welding tape in the longitudinal direction are a multiple of the dimensions in the transverse direction which is arranged perpendicularly to the longitudinal direction, an inner cover layer, which in a designated in-use position faces away from the parts of the workpieces which are to be directly connected, an outer cover layer, wherein the inner cover layer and the outer cover layer in a cross section perpendicular to the longitudinal direction close off the welding tape to the outside, at least one adhesive layer, which is provided in the transverse direction at least in side edge regions of the inner cover layer and by means of which the welding tape is fastenable to the workpieces to be connected, a self-combusting exothermic substance, which is provided in the interior of the cover layer and which during ignition provides the thermal energy which is required for the welding, a non-combustible heat shield, which is arranged exclusively between the exothermic substance and the outer cover layer, which withstands the burn-off temperature of the exothermic substance, and which counteracts the escape of heat to the outside, and a welding additive, which is provided between the exothermic substance and the inner cover layer, which melts during the burn off of the exothermic substance and is connectable to the workpieces to be connected.

2. The welding tape as claimed in claim 1, wherein the exothermic substance and the welding additive are of tape-like design.

3. The welding tape as claimed in claim 1, wherein an ignition agent is arranged in the direct proximity of the exothermic substance in order to ensure a complete burn off of the exothermic substance.

4. The welding tape as claimed in claim 3, wherein the exothermic substance is in a multiple of parts and the ignition agent is arranged between two adjacent parts of the exothermic substance.

5. The welding tape as claimed in claim 3, wherein electric ignition cables are introduceable into the ignition agent.

6. The welding tape as claimed in claim 1, wherein the inner cover layer is designed, adhesively fastened or welded in one piece with the outer cover layer.

7. The welding tape as claimed in claim 1, wherein the outer cover layer is completely covered by a pressure layer, so that a pressure chamber, which is delimited at least by the outer cover layer and the pressure layer, is created.

8. The welding tape as claimed in claim 6, wherein the pressure layer is adhesively fastened or welded to the outer cover layer or to the adhesive layers.

9. The welding tape as claimed in claim 1, wherein the interior of the cover layer is free of oxygen or nitrogen or filled with an inert gas.

10. The welding tape as claimed in claim 1, wherein a ceramic separating layer is provided between the exothermic substance and the welding additive.

11. The welding tape as claimed in claim 1, wherein provision is made in the cover layer, in the exothermic substance, in the welding additive or in the separating layer for weak points at which the welding points can be easily separated.

* * * * *